(12) United States Patent
Yap

(10) Patent No.: US 7,911,673 B1
(45) Date of Patent: Mar. 22, 2011

(54) DISPLAY SCREEN WITH OPTICAL MEMORY

(75) Inventor: Daniel Yap, Newsbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 748 days.

(21) Appl. No.: 11/940,944

(22) Filed: Nov. 15, 2007

Related U.S. Application Data

(60) Provisional application No. 60/867,376, filed on Nov. 27, 2006.

(51) Int. Cl.
*G02F 1/03* (2006.01)
(52) U.S. Cl. ........................ 359/242; 359/241
(58) Field of Classification Search ................ 359/232, 359/238, 241, 242; 250/461; 345/204, 214
See application file for complete search history.

(56) References Cited

U.S. PATENT DOCUMENTS

| | | | |
|---|---|---|---|
| 5,618,654 A | 4/1997 | Takei et al. | |
| 5,691,091 A | 11/1997 | Chaiken | |
| 5,988,822 A | 11/1999 | Abe | |
| 6,366,388 B1 | 4/2002 | Hampp et al. | |
| 2006/0290595 A1* | 12/2006 | Takeuchi et al. | 345/55 |

OTHER PUBLICATIONS

B. Gnade, A. Akinwande, R. Shashidhar and J. Larimer "Display bandwidth reduction via latched pixels and processing at the pixel," SPIE Proceedings, vol. 4712 (2002), pp. 313-317.
T. Tsujioka, M. Kume and M. Irie "Superlow-power readout characteristics of photochromic memory," Japanese Journal of Applied Physics, vol. 34 (1995) pp. 6439-6443.
E. Molinari, et al., "Photochromic polymers for erasable focal plane masks and re-writable volume phase holographic gratings," SPIE Proceedings, vol. 4485 (2002), pp. 469-477.
N. Hampp, M. Sanio and K. Anderle "High-resolution direct-view displays based on the biological photochromic material bacteriorhodopsin," SPIE Proceedings, vol. 3636 (1999), pp. 40-47.
A. J. Myles, T. J. Wigglesworth and N. R. Branda "A multi-addressable photochromic 1,2-dithienylcyclopentene-phenoxynaphthacene-quinone hybrid," Advanced Materials, vol. 15, No. 9 (2003), pp. 745-748.
N. Davies, M. McCormick and L. Yang, "Three-dimensional imaging systems: a new development," Applied Optics, vol. 27, n. 21 (1988) pp. 4520-4528.
P. Harman, "Retroreflective screens and their applications to autostereoscopic displays," SPIE Proceedings, vol. 3012 (1997) pp. 145-153.
D. G. Hopper, "1000X difference between current displays and capability of human visual system: payoff potential for affordable defense systems," SPIE Proceedings, vol. 4022 (2000), pp. 378-389.
A. Peters, R. McDonald and N. R. Branda "Regulating p-conjugated pathways using a photochromic 1,2-dithienyl cyclopentene," Chem. Communications 2002, pp. 2274-2275.
M. S. Kim, T. Sakata, T. Kawai and M. Irie, "Amorphous photochromic films for near-field optical recording," Japanese Journal of Applied Physics, vol. 42 (2003), pp. 3676-3681.

(Continued)

*Primary Examiner* — Timothy J Thompson
(74) *Attorney, Agent, or Firm* — George R. Rapacki; Daniel R. Allemeier

(57) ABSTRACT

The invention is a multi-color display screen that has built in optical memory for each pixel location. The optical memory is optically read and optically programmed. The screen itself distinguishes between the specific colors from which a full-color (or multi-color) image is constructed and modulates the intensities of the component colors that it directs toward a viewer. The screen provides enhanced image resolution and reduces information bandwidth required to control the display the image.

24 Claims, 10 Drawing Sheets

OTHER PUBLICATIONS

N. Sokolyuk and L. Pisulina, "Synthesis and photochromism of peri-phenoxysubstituted azanaphthacenequinones," SPIE Proceedings, vol. 3347 (1998), pp. 189-194.

A. Peters, C. Vitols, R. McDonald and N. R. Branda, "Novel photochromic compounds based on the 1-thienyl-2-vinylcyclopentene backbone," Organic Letters, vol. 5, n. 8 (2003), pp. 1183-1186.

P. S. Ramanujam and R. H. Berg, "Photochromic processes for high density optical storage," SPIE Proceedings, vol. 5069 (2003), pp. 57-63.

N. Tanio and M. Irie, "Photooptical switching of polymer film waveguide containing photochromic diarylethenes," Japanese Journal of Applied Physics, vol. 33 (1994), pp. 1550-1553.

J. Chauvin, T. Kawai and M. Irie, "Refractive index change of an amorphous bisbenzothienylethene," Japanese Journal of Applied Physics, vol. 40 (2001), pp. 2518-2522.

J. Biteau, et al., "Large and stable refractive index change in photochromic hybrid materials," Chem. Materials, vol. 10 (1998), pp. 1945-1950.

L. Harris and R. T. McGinnies, "The preparation and optical properties of gold blacks," Journal of the Optical Society of America, vol. 38, n. 7 (1948), pp. 582-589.

Y. Koike, A. Kanemitsu Y. Shoida, E. Nihei and Y. Ohtsuka, "Spherical gradient-index polymer lens with low spherical aberration," Applied Optics, vol. 33 (1994), pp. 3394-3400.

* cited by examiner (Prior Art)

(Prior Art)

(Prior Art)

7(a)

7(b)

7(c)

DISPLAY SCREEN WITH OPTICAL MEMORY

CROSS-REFERENCE

This application claims priority to provisional application 60/867,376 filed on Nov. 27, 2006 titled Display Screen with Optical Memory.

This application is related to co-pending U.S. Application No. 60/865,619 titled "Programmable Optical Label," filed on Nov. 13, 2006; and U.S. Application No. 60/865,608, titled "Optical Identification System and Method" filed on Nov. 13, 2006. Both applications are incorporated herein by reference in their entirety.

STATEMENT OF FEDERALLY SPONSORED RESEARCH

This invention was not developed under federal contract

BACKGROUND

This invention relates to the field of displaying imagery on a display screen. In particular, the present invention relates to a multi-color display screen with optically programmable memory capable of greatly enhancing quality of the display image and relaxing the information bandwidth required of the display controlling equipment.

A conventional projection display system functions as follows: imaging light emitted from a light source is projected on a projection screen, and viewers observe the imagery projected on the screen.

Most present display systems completely update each frame of the image at a rate of 30-60 Hz. This practice is historical, based on the properties of typical cathode ray tube displays. The full-screen refresh requirement makes the updating and driving technology associated with ultra-high resolution displays very challenging. For example, the high I/O bandwidths will require driver electronics having very high clock rates, which will result in high power dissipation. In typical motion video applications, however, the information at every pixel does not change so rapidly. Thus, if the display can remember the information content of each pixel, only those pixels having changed content need to be updated. Furthermore, those updates typically can occur at a much slower rate than 60 Hz. Incidentally, those applications, such as synthetic aperture radar (SAR) imaging, that generate data that require the highest display resolution also generally have the slowest update rates.

Advanced imaging sensors generate large amount of data that will require ultra-high resolution displays if their entire images are to be viewed. For example, staring infrared sensors with 25 million pixel resolution are being developed. Present day IMAX movie formats provide 30 million pixels per frame. Also, data generated by synthetic aperture radar (SAR) sensors can have over 1 billion pixels. Thus, the display system must be capable of handling many more pixels if such sensor data are to be displayed.

The incorporation of memory into a display screen means that only the portions of an image that change from one frame to the next needs to be updated. Some formats for video data compression (such as MPEG-2) are based on representing only the changes that occur between frames of an image and are compatible with such an approach for the display. The MPEG-2 format can result in a reduction in data rate of more than 50:1. Other compression formats such as MPEG-4 project even greater reductions in data rate.

The incorporation of memory into the display screen makes possible display systems that have a very large number of pixels for ultra-high resolution. The resolution of the HDTV format (with more than 2 million pixels) matches the visual acuity of a person having 20/20 vision if the size of the display is small compared to its distance from the viewer. However, if a person is viewing a large area screen, such as in typical home-entertainment settings, improvements in the resolution of the screen may be perceptible. In that case, a display system capable of more pixels often is preferred. Even more pixels would be needed if the viewer is located closer to the screen, for a more immersive experience. For example, the screen would need to have 21.2 million pixels to match the visual acuity of that person if she is located two meters away from the screen. See. D. G. Hopper, "1000× difference between current displays and capability of human visual system: payoff potential for affordable defense systems," SPIE Proceedings, vol. 4022 (2000), pp. 378-389.

As an example, consider a projector that produces a beam that is scanned across the many pixel locations of a screen. This projector might contain some means (such as rotating mirrors) to raster scan the output beam across the surface of the screen. A typical HDTV screen has 1920×1080 pixels. At a frame rate of 60 per second with progressive (instead of interlaced) scanning of the vertical lines for the image, such a video format would require each pixel to be modulated at a rate of approximately 125 MHz if every pixel must be updated in each frame.

Lasers or LEDs could be used as the light sources and many types of those devices can be modulated at a rate of 125 MHz or higher. The HDTV format has acceptable image resolution if the viewer is suitably distant from the display screen. However many more pixels would be needed for applications that desire even larger display areas with the same visual resolution (i.e., permitting shorter viewing distances). A large area display capable of displaying entire SAR images may require 20,000×10,000 pixels or more. In this case, the lasers or LEDs would need to be modulated at a rate of 12.5 GHz or higher. Such a modulation rate is currently not available for most laser wavelengths and is not possible with LEDs. Of course the large area display could be divided into sections of smaller area, with a separate projector used to illuminate each section. However, the use of a large number of projectors by such a tiled approach may not be desirable or may be too costly in some applications.

The modulation rate requirement on the lasers/LEDs can be relaxed substantially if the screen has memory and those optical sources are used only to reprogram or change the image information stored in selected pixels. For the example given above of a ultra-high resolution large area display that has 20,000×10,000 pixels, the kind of data encoding provided by the MPEG-2 format means the modulation rate for the lasers or LEDs that program the screen could be much lower, even as low as approximately 250 MHz. This is because the programming projector need only update those pixels of the display screen whose video content has changed from one frame to the next. Having the image memory located in the screen rather than in the projector also means that the video memory in the projector could be much smaller. This reduction can be achieved if the MPEG-2 input is used to directly control the programming projector rather than to update a video memory that contains the information for the entire screen area.

Information relevant to attempts to address these problems can be found in U.S. Pat. Nos. 5,618,654; 5,691,091; 5,988, 822 and 6,366,388. Furthermore, see: B. Gnade, A. Akinwande, R. Shashidhar and J. Larimer, "Display bandwidth reduction via latched pixels and processing at the pixel," SPIE Proceedings, vol. 4712 (2002), pp. 313-317; T. Tsujioka, M. Kume and M. Irie, "Superlow-power readout characteristics of photochromic memory," Japanese Journal of Applied Physics, vol. 34 (1995) pp. 6439-6443; E. Molinari, et al., "Photochromic polymers for erasable focal plane masks and re-writable volume phase holographic gratings," SPIE Proceedings, vol. 4485 (2002), pp. 469-477; N. Hampp, M. Sanio and K. Anderle, "High-resolution direct-view displays based on the biological photochromic material bacteriorhodopsin," SPIE Proceedings, vol. 3636 (1999), pp. 40-47; A. J. Myles, T. J. Wigglesworth and N. R. Branda, "A multi-addressable photochromic 1,2-dithienylcyclopentene-phenoxynaphthacene-quinone hybrid," Advanced Materials, vol. 15, no. 9 (2003), pp. 745-748; N. Davies, M. McCormick and L. Yang, "Three-dimensional imaging systems: a new development," Applied Optics, vol. 27, n. 21 (1988) pp. 4520-4528; P. Harman, "Retroreflective screens and their applications to autostereoscopic displays," SPIE Proceedings, vol. 3012 (1997) pp. 145-153. However, each one of these references suffers from one or more of the following disadvantages: electrically active (requires power to maintain memory); single-color display only; requirement of multi-peak spectral sensitive photochromic materials; incapable of displaying multiple images on retro-reflective screen;

For the foregoing reasons, there is a need for an optically programmable screen with memory that provides wavelengths specific modulation of the reflection or transmission of the display screen, enhanced resolution and reduced information bandwidth. There is also a need for a multi-color display screen with memory to render a full color display. Furthermore, there is a need for a display screen with memory that is electrically passive and can select between different wavelengths of programming light or different wavelength components of illumination light.

SUMMARY

The present invention generally provides a multi-color electrically passive projection display screen with memory that provides for enhanced resolution and reduced information bandwidth requirement.

In one aspect of the present invention, a projection screen on which an image can be displayed by receiving a projection light, the screen comprises a plurality of pixels, each of the plurality of pixels comprising at least three pixel portions, each pixel portion comprising: a programmable wavelength selective reflection layer having a photochromic material; a multi-peak transmission filter layer; and an output transmission filter layer; wherein the programmable wavelength selective reflection layer is situated between the multi-peak transmission filter layer and the output transmission filter layer; whereby each pixel portion modulates a different predetermined wavelength of light.

In another aspect of the present invention, a projection screen on which an image can be displayed by receiving a projection light, the screen comprises a plurality of pixels, each of the plurality of pixels comprising at least three pixel portions, each pixel portion comprising: a programmable wavelength selective reflection layer, having a photochromic material; a multi-peak transmission filter layer; and a black absorber layer; wherein the programmable wavelength selective reflection layer is situated between the multi-peak transmission filter layer and the black absorber layer; whereby each pixel portion modulates a different predetermined wavelength of light.

Furthermore, in the above described aspect of the invention, it is preferable that the each pixel portion further comprises a retro-reflecting structure.

In yet another aspect of the present invention, a projection screen on which an image can be displayed by receiving a projection light, the screen comprises a plurality of pixels, each of the plurality of pixels comprising at least three pixel portions, each pixel portion comprising: a programmable wavelength selective reflection layer, having a photochromic material; a multi-peak reflection filter layer; a multi-peak transmission filter layer; a diffractive element layer; and a black absorber layer; wherein the programmable wavelength selective reflection layer is situated between a first side of the multi-peak transmission filter layer and the programming light reflection filter layer; the diffractive element layer is situated between the second side of the multi-peak transmission filter layer and the black absorber layer; whereby each pixel portion modulates a different predetermined wavelength of light.

In another aspect of the present invention, a projection screen on which an image can be displayed by receiving a projection light, the screen comprises a plurality of pixels, each of the plurality of pixels comprising at least three pixel portions, each pixel portion comprising: a waveguide with at least one end, a front side, and a back side; the waveguide comprising a plurality of spherical beads forming bulged areas on the front side and the back side of the waveguide where the beads are located; a multi-peak transmission filter layer disposed on the front side of the waveguide substantially covering the bulged areas thereon; a programmable wavelength selective reflection layer overlaid on the multi-peak transmission filter layer; a first programming light reflection filter layer overlaid on the programmable wavelength selective reflection layer; a black absorber layer disposed on the back side of the waveguide substantially covering the bulged areas thereon; whereby each pixel portion modulates a different predetermined wavelength of light.

Furthermore, in the above-described another aspect of the projection screen, it is preferable that the each pixel portion further comprises a second programming light reflection filter layer disposed between the black absorber layer and the back side of the waveguide.

In yet another aspect of the present invention, a projection screen on which an image can be displayed by receiving a projection light, the screen comprise a plurality of pixels, each of the plurality of pixels comprising at least three pixel portions, each pixel portion comprising: a waveguide with at least one end, a front side, and a back side; the waveguide comprising a plurality of spherical beads forming bulged areas on the front side and the back side of the waveguide where the beads are located; a multi-peak transmission filter layer disposed at the at least one end of the waveguide wherein a programming light is coupled into the waveguide; a programmable wavelength selective reflection layer disposed on the front side of the waveguide substantially covering the bulged areas thereon; a first programming light reflection filter layer overlaid on the programmable wavelength selective reflection layer; a black absorber layer disposed on the back side of the waveguide where the beads resided substantially covering the bulged areas thereon; whereby each pixel portion modulates a different predetermined wavelength of light.

Furthermore, in the above-described another aspect of the invention, it is preferable that the projection screen further comprises a second programming light reflection filter layer disposed between the black absorber layer and the back side of the waveguide.

Furthermore, in the above-described aspects of the invention, it is preferable that the photochromic material may be selected from the group consisting essentially of: 2,3-bis(2-methylbenzo[b]thiophen-3-yl) maleic anhydride; thiophen-3-yl perfluorocyclopentene; 1,2-bis(5-(2,4-diphenylphenyl)-2,4-dimethyl-3-thienyl) perfluorocyclopentene; 11-phenoxy-10-aza-5,12-naphthacene-quinone; 1,2-dithienylalkenes; vinylcyclopentenes; diarylethenes; bisbenzothienylethenes; and anthracene dipeptide.

Furthermore, in the above-described aspects of the invention, it is preferable that the black absorber layer may be constructed from various known materials such as carbon-black paint, gold-black films and carbon-nanotube coatings.

DESCRIPTION OF THE DRAWINGS

The present invention will be understood and appreciated more fully from the following detailed description taken in conjunction with the drawings described below.

FIG. 8b is a sectional view of a programmable reflection filter shown as part of FIG. 8a.

DESCRIPTION

Figure 1:
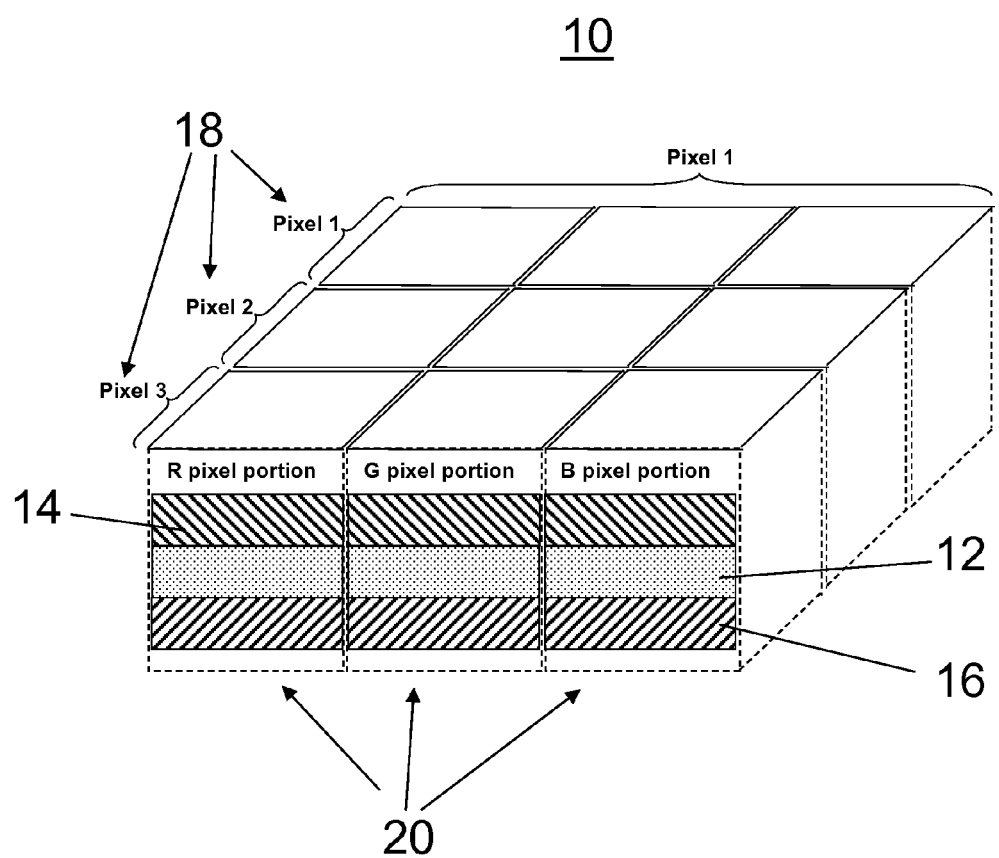
FIG. 1 is a perspective view of a projection screen according to an embodiment of the present invention.

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of layers and other elements shown in the accompanying drawings may be exaggerated to more clearly show details. The present invention should not be construed as being limited to the dimensional relations shown in the drawings, nor should the individual elements shown in the drawings be construed to be limited to the dimensions shown.

The present invention is a display screen 10 with memory. The screen 10 comprises two or more functional layers. FIG. 1 shows an exemplary embodiment of the present invention. It illustrates some of the basic functional layers of the screen 10. A first functional layer 12 is a wavelength selective and latching filter whose reflection or transmission at a particular wavelength or band of wavelengths can be programmed. The first functional layer 12 contains photochromic or photoelectrochromic material whose optical state can be changed by a programming light, thereby changing the optical properties of the latching filter. A second functional layer 14 is an optical transmission filter—a programming filter—that selects one set of wavelengths of the programming light to be used in programming the state of the photochromic material in the first functional layer 12. A third functional layer 16 removes unwanted wavelengths of light from being directed toward a viewer of the screen 10.

The display screen 10 preferably consists of multiple sub-regions, hereinafter called the pixels 18, which can be programmed individually. For a full-color display, each of the pixels 18 may be further divided into multiple pixel portions 20 that may have specific sensitivity to the different basic optical wavelengths used to construct a full-color image. As an example, a 3 color RGB (Red Green Blue) display may use 600 nm as the R (Red) wavelength, 550 nm as the G (Green) wavelength and 465 nm as the B (Blue) wavelength. Other combinations of wavelengths also may be used and many such combinations have been defined in various CIE color-matching diagrams.

In various embodiments of the present invention, each pixel 18 of the screen 10 preferably comprises 3 or more pixel portions 20. For example, one pixel portion 20 is sensitive to the R wavelength, one pixel portion 20 is sensitive to the G wavelength and another pixel portion 20 is sensitive to the B wavelength. Although a 3-color display screen is discussed herein, the present invention also is applicable to memory screens for displays that have other numbers of component colors, such a two-color displays or displays that have more than 3 component colors. For example, some new concepts for highly vibrant displays make use of 5 component colors.

In one preferred embodiment, a large-area screen 10 comprises multiple narrow strips wherein a given strip contains the structures for one kind of pixel portion and modulates one particular R, G or B wavelength. These strips can be made by slitting large sheets that contain the structures for one of the kinds of pixel portion structures. The strips may also be spun together with fiber comprising polyester, nylon or some other common material used for making yarns for fabrics. The strips can then be woven into fabric, with alternating strands of the fabric consisting of spun strips that contain the R, G and B structures. Other common fabric materials also could be woven into the fabric, perhaps used to form residual visual or textural decorative patterns. Known slitting, spinning and weaving processes may be used to make a fabric that contains the R, G and B strips. To make the strips lay flat on the fabric, so that the various parts of the pixel portions are oriented approximately in the planar direction of the fabric, the strips preferably are several times wider than they are thick. The strips may be placed as the warp or weft yarns of a fabric. They even may be placed in criss-cross fashion as both warp and weft yarns.

In some embodiments of the invention, the screen 10 functions as a transmission modulator for a rear projection system. In other embodiments, the screen functions as a reflection modulator for a front projection system. In some embodiments of optically programmed screens, a programming light and an illumination light are incident upon the screen from the same side of the screen 10. For other embodiments, the programming light and the illumination light are supplied from different sides of the screen 10. The programming light even can be supplied from the edges of the screen 10. Furthermore, the programming signal may affect a single pixel 18 or a group of multiple adjacent pixels 18.

In some embodiments, the screen 10 is typically used in combination with a projector and an illuminator. The illuminator produces light that contains the three visible wavelengths ($\lambda R, \lambda G, \lambda B$) that can be transmitted to the viewer (or reflected back to the viewer) for generating the image for that viewer. The illuminating light beam preferably flood illuminates the screen but also could be scanned across the multiple pixels 18 of the screen 10. Each pixel 18 then modulates the intensities of the three colors that are transmitted through (or reflected from) the pixel by means of its three color-specific pixel portions 20 operating in the manner described below.

Figure 2:
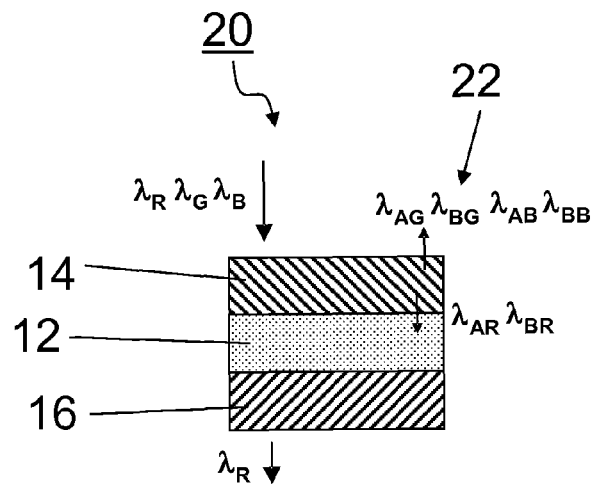
FIG. 2 is a sectional view of a pixel portion of the screen shown in FIG. 1.

As one preferred embodiment, FIG. 2 shows a cross-sectional illustration of color-specific pixel portion 20 in a transmission modulating display screen 10. This portion 20 has a programmed transmission for the R wavelength ($\lambda R$), for example, and does not transmit the G and B wavelengths ($\lambda G$, $\lambda B$). Other color-specific portions 20 of each pixel 18 can have other programmed transmission for only the G or the B wavelengths. In this way, the intensities of the R, G and B wavelengths that are transmitted through a given pixel 18 can be modulated. The desired color and brightness of light for that pixel 18 is defined by the transmissions of its R, G and B portions. Each pixel portion 20 contains photochromic material that can be programmed.

A programming projector produces light, typically at 3 shorter wavelengths ($\lambda AR, \lambda AG, \lambda AB$) and typically that are in the blue or the UV, which are used to program the photochromic material to a particular state. The projector also may produce light at one or more longer wavelengths ($\lambda BR, \lambda BG, \lambda BB$) and typically in the visible, which are used, possibly in combination with the shorter wavelength programming light, to program the photochromic material to other states. The programming projector also may produce light at one or more even longer wavelengths ($\lambda C$) and preferably in the "eyesafe" band that may be used to facilitate or gate the programming of the photochromic material. The light at the blue/UV and the visible wavelengths are typically combined into a single optical programming light beam 22 that can be scanned over the entire viewing surface of the screen 10 to program the screen 10. Different combinations of programming wavelengths can be selected and projected onto the screen 10 when the programming beam 22 illuminates different pixels 18 (or collections of pixels) of the screen 10. In this way, different pixels 18 can be programmed to have different transmission or reflection levels. The projector programs the screen (by scanning it with the modulated blue/UV and/or visible light) and an illuminator "reads" the screen (by illuminating it with a CW (Continuous Wave) white or 3-color visible light).

FIG. 2 shows a preferred embodiment of a pixel portion 20 comprising three functional parts. The first function part 12 contains a photochromic memory material. The transmission of a pixel portion 20 can be modified by this photochromic material. This transmission modulator may comprise one or more layers of photochromic material and possibly also one or more layers of non-photochromic materials. The second functional part 14 is a transmission filter that selects the wavelengths for programming the photochromic material (e.g., $\lambda AR, \lambda BR$). It also transmits the desired output wavelength (e.g., $\lambda R$) of that pixel portion 20. Thus, only these three wavelengths are allowed to illuminate the photochromic material of the first functional part 12. The third functional part 16 is an output transmission filter that is matched to the specific R, G or B wavelength (e.g., $\lambda R$) of that pixel portion 20. The pixel portion 20 may have an optional fourth functional part, such as comprising a layer of lens beads, that acts as a diffusive scatterer of the light transmitted through the combination of the first three functional parts. That light should comprise the desired intensity modulated R, G or B wavelength for that pixel portion 20.

The second functional part 14 of a pixel portion 20 transmits only those programming wavelengths that are used to program the photochromic material in the first functional part 12 of that pixel portion 20. The second functional part 14 is needed if the programming light beam 22 is large enough to overlap more than one pixel portion 20. In that case, the programming light beam 22 would contain the programming wavelengths for all three pixel portions 20 of a pixel 18. Each pixel portion 20 would then need to select those wavelength components that are associated with that pixel portion 20. This capability of the display screen 10 to select among programming wavelengths is optional but desirable. It allows the spot size of the programming light beam 22 to be larger than the size of a pixel portion 20.

Figure 3:
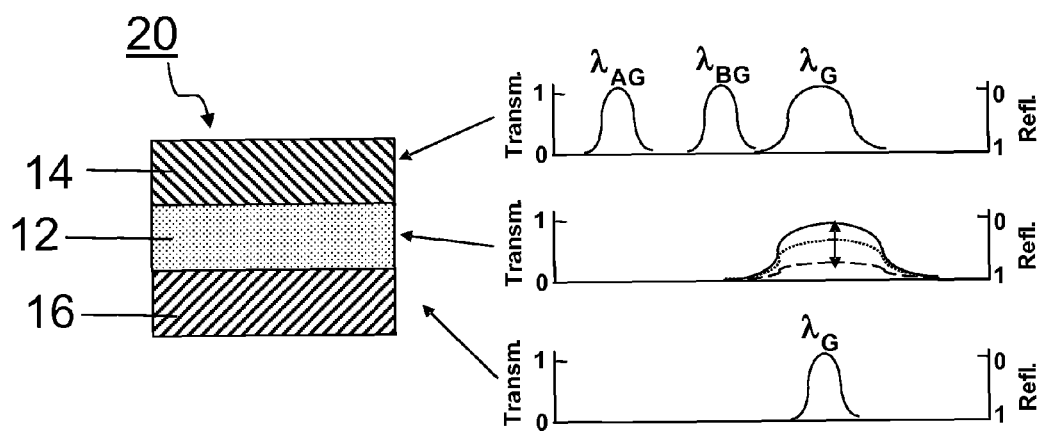
FIG. 3 is a sectional view of a pixel portion of the screen shown in FIG. 1.

Referring to FIG. 3, in some embodiments, the first functional layer 12 may comprise a programmable variable light absorber. In these embodiments, the primary effect of changing the state of the photochromic material in the first functional layer 12 is to change its absorption at the wavelength (e.g., $\lambda G$) associated with that pixel portion 20. The output filter, the third functional layer 16, transmits only the associated wavelength (e.g., $\lambda G$) and excludes the other wavelengths (e.g., $\lambda R, \lambda B$) as well as the programming wavelengths (e.g., $\lambda AG, \lambda BG$). The combined effect of the second 14 and third 16 layer is the desired wavelength specific transmission filter whose transmission level can be modulated. In particular, the spectral width of the corresponding changeable absorption feature in the photochromic material could overlap the non-associated illumination wavelengths (e.g., $\lambda R$, $\lambda B$). However, since those other wavelengths are rejected by the output filter, they are not observed by the viewer.

FIG. 4 shows the absorption spectra of some exemplary photochromic materials that may be used in some embodiments of a pixel portion 20 that is illustrated in FIG. 3. Many photochromic organic molecules can change between a state that has a closed-ring form and an open-ring form. For example, when a molecule is in its open-ring isomer, it may absorb at UV and blue wavelengths (generally at wavelengths shorter than 530 nm). However, a closed-ring isomer of that molecule will have reduced absorption at its shorter wavelength peak and exhibit one or more absorption peaks at a longer wavelength that is typically more than 50 to 100 nm greater than the absorption peak for the open-ring isomer. The heights of the absorption peaks depend on the relative amounts of the closed-ring and the open-ring isomers in a film. Such photochromic material may be used as programmable absorbers for the R, G or B light.

Thus, the transmission of the R, G or B light through a given pixel portion 20 can be modulated by controlling the relative amounts of the closed-ring and open-ring isomers of the photochromic material in that given pixel portion 20. Different pixel portions 20 may have different ratios of those two isomers and also may contain different photochromic materials. Thus, different pixel portions 20 can produce different degrees of brightness by modulating the illumination light differently.

Figure 4A:
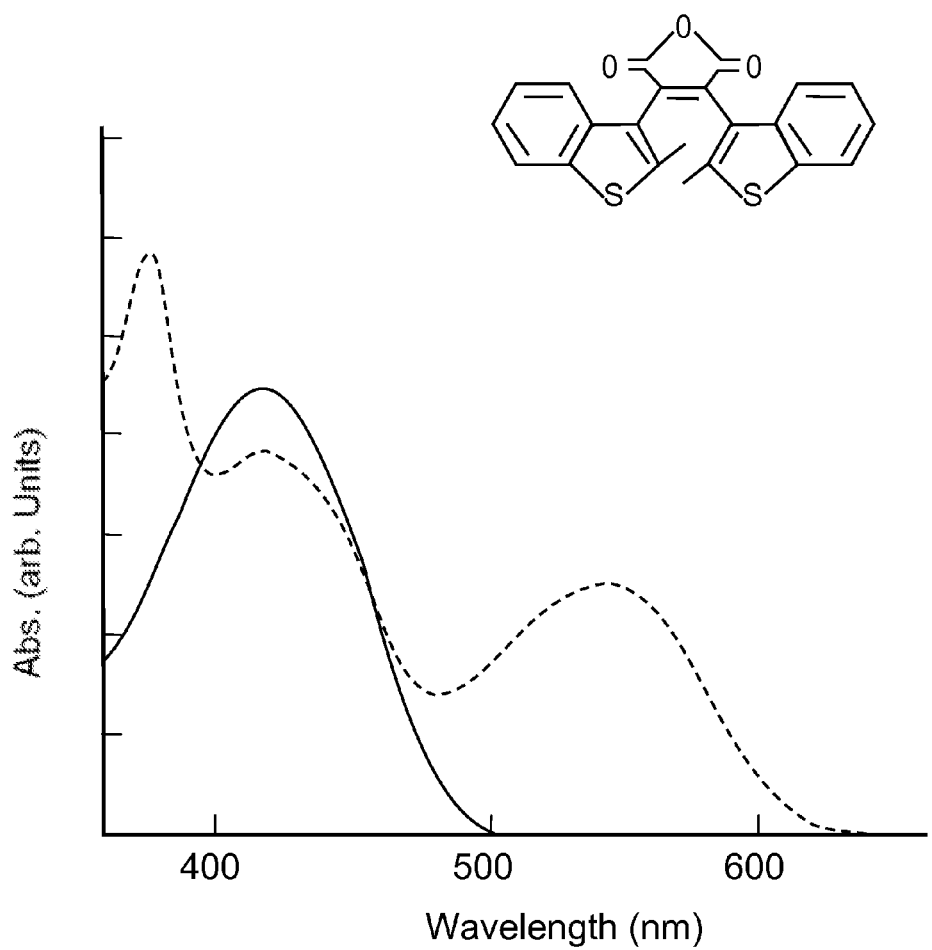
FIG. 4 shows the absorption spectra and chemical structures of exemplary photochromic materials according to an embodiment of the present invention.

An example of a photochromic material that might be used in the display screen 10 is 2,3-bis(2-methylbenzo[b]thiophen-3-yl) maleic anhydride. See T. Tsujioka, M. Kume and M. Irie, "Superlow-power readout characteristics of photochomic memory," Japanese Journal of Applied Physics, Vol. 34 (1995), pp. 6439-6443, which is herein incorporated by reference. In its open-ring isomer form, this molecule has an absorption peak near 430 nm and has very little absorption at either 550 or 600 nm (as shown in FIG. 4a). When the molecule is in its closed-ring isomer form, its absorption at 430 nm is reduced and a new absorption peak occurs at longer wavelengths. This new peak is fairly broad and is highest near 550 nm. There also is significant absorption at 600 nm. A film containing this photochromic material may be used as a programmable filter to modulate the transmission of the R light through a pixel 18.

Figure 4B:
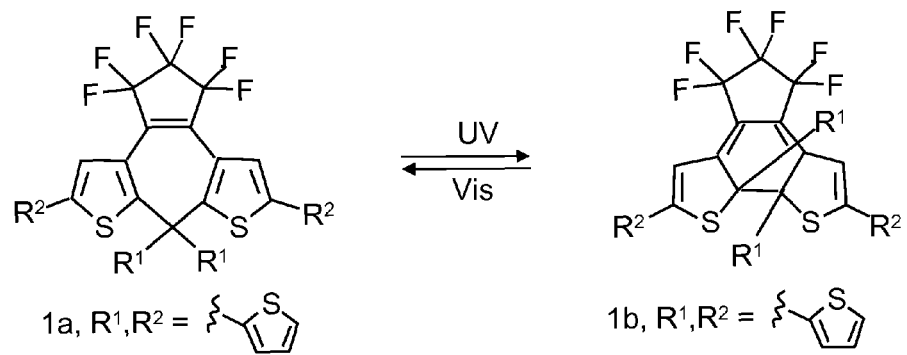
Figure 4B:
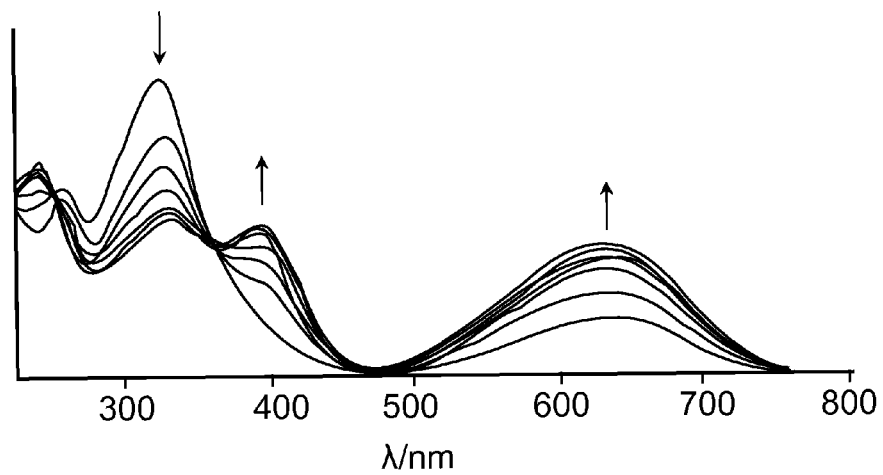

A slightly different photochromic molecule of that family is a modified thiophen-3-yl perfluorocyclopentene. See A. Peters, R. McDonald and N. R. Branda, "Regulating p-conjugated pathways using a photochromic 1,2-dithienyl cyclopentene," Chem. Communications 2002, pp. 2274-2275, which is herein incorporated by reference. The absorption spectra of this molecule are shown in FIG. 4b. The open-ring form of this molecule has an absorption peak that is centered near 320 nm, with no absorption at 550 nm. The closed-ring form, however, has significant absorption at 550 nm, with a broad absorption peak centered near 640 nm. A film containing this material can be used to modulate the transmission of the G light through a pixel 18.

A photochromic material that has programmable absorption suitable for modulating the B wavelength light transmitted through a pixel 18 is 1,2-bis(5-(2,4-diphenylphenyl)-2,4-dimethyl-3-thienyl) perfluorocyclopentene. See M. S. Kim, T. Sakata, T. Kawai and M. Irie, "Amorphous photochromic films for near-field optical recording," Japanese Journal of Applied Physics, vol. 42 (2003), pp. 3676-3681, which is herein incorporated by reference. This molecule has no absorption at wavelengths above 400 nm when it is in its open-ring form (see FIG. 4c). However, when in its closed-ring form, it has significant absorption at 465 nm, with the broad absorption peak located near 580 nm.

Figure 4C:
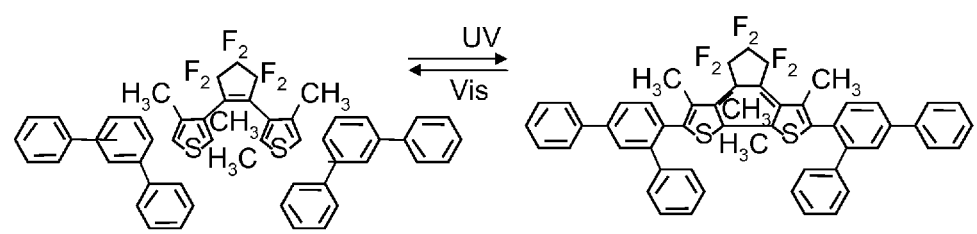
Figure 4C:
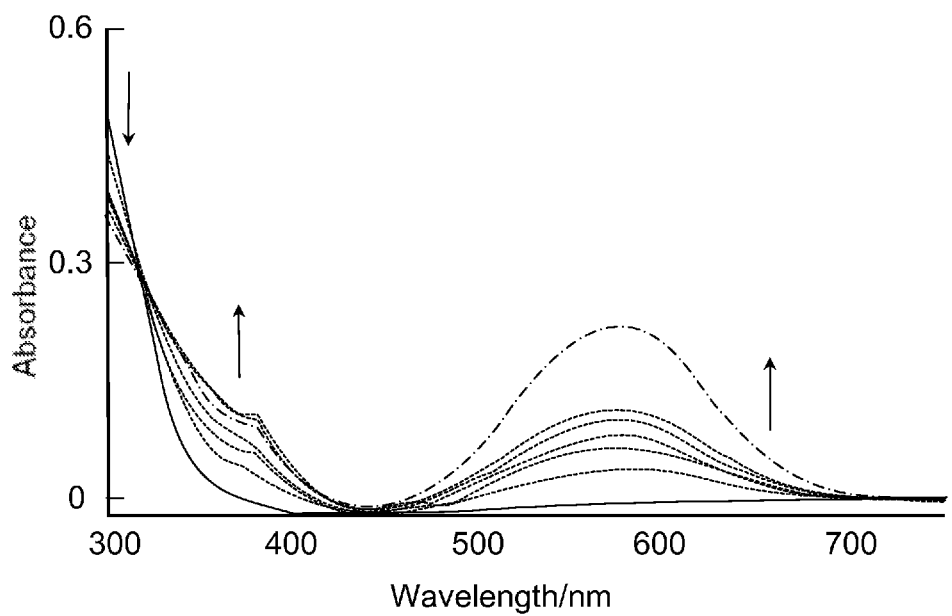

Thus, the first photochromic material as shown in FIG. 4a may be used for the pixel portion 20 that modulates the R light. The second photochromic material shown in FIG. 4b could be used for the pixel portion that modulates the G light. And, the third photochromic material as shown in FIG. 4c could be used for the pixel portion that modulates the B light. The relative amount of absorption a film containing these photochromic materials will have depends on the relative percentage of the open-ring and closed-ring isomers.

A film containing photochromic molecule that can be cycled between these open-ring and closed-ring isomers forms can have its transmission modulated by applying either more of the shorter-wavelength programming light (to enhance the closed-ring forms and thereby reduce the transmission of the film) or more of the longer-wavelength programming light (to enhance the open-ring forms and thereby increase the transmission of the film). Exemplary programming wavelengths that may be used to increase the absorption for these three exemplary molecules are 490 nm, 330 nm and 300 nm, respectively, for the molecules shown in FIGS. 4a, b and c. The absorption of these three molecules for the R, G and B light can be increased by exposing the molecules to higher intensities of the respective programming light or for longer time intervals. Exemplary programming wavelengths that may be used to decrease the absorption are 525 nm, 640 nm and 575 nm, respectively, for the molecules shown in FIGS. 4a, b and c.

The above exemplary photochromic molecules are selected such that their absorption of the associated R, G, or B light by their closed-ring form will not greatly alter their programmed states. Thus, the "reading" of the state of the molecules to generate the displayed image will have a smaller effect on that state. This feature increases the length of time that the pixel 18 can hold its state before being updated. Furthermore, programming wavelengths are selected such that they are clearly distinct from each other and also from the associated R, G or B wavelength. This makes the design of the programming filter easier to do.

In FIGS. 2 and 3, the second functional layer 14, the programming filter, typically has three transmission peaks. These peaks overlap with the two programming wavelengths and with the associated R, G or B wavelength of that pixel portion 20. Using the photochromic material shown in FIG. 4a as an example, the programming filter for the R pixel portion 20 has narrow transmission peaks located at 490 nm and 525 nm plus another peak at 600 nm. The programming filter for the G pixel portion has narrow transmission peaks located at 330 nm and 640 nm plus another peak at 550 nm. The programming filter for the B pixel portion has narrow transmission peaks located at 300 nm and 575 nm plus another peak at 465 nm. These programming wavelengths have been selected such that the wavelengths to be produced by the programming projector are separated by at least 25 nm. This guideline increases the bandwidths that the transmission peaks of the programming filters can have. In general, having wider transmission peaks allows the wavelengths of the programming light to deviate slightly and thereby relaxes the constraint places on light sources and/or filters in the programmer.

The third functional layer 16, the output filter, typically has a single, narrow transmission peak that is centered at the desired output wavelength (e.g., λG) for that pixel portion 20. This output filter must be able to reject the other display wavelengths (e.g., λR and λB) as well as the programming wavelengths (e.g., λAG, λBG) used to program the photochromic material of that pixel portion 20. As an example, the output filter for an exemplary G pixel portion would transmit light at 550 nm and reject light at 465 nm and 600 nm as well as at 330 nm and 640 nm.

An optical filter that contains multiple transmission peaks can be constructed as a cascade of multiple single-peak transmission filters. One known construction of a transmission filter that can be cascaded is a Fabry Perot etalon that has a gap layer sandwiched between a pair of optical reflectors. These optical reflectors (which also are known as Bragg reflectors) reflect light within a specific wavelength band and transmit light at wavelengths outside of that band. The reflectors and the gap layer define an optical cavity. The etalon is effective only over the band of wavelengths where its Bragg reflectors have significant reflection. For wavelengths outside of that band, the etalon has fairly high transmission and does not perform any filtering. There can be one or more narrow transmission peaks located at specific wavelengths within the band. The transmission is comparatively low at other wavelengths within the band.

Figure 5A:
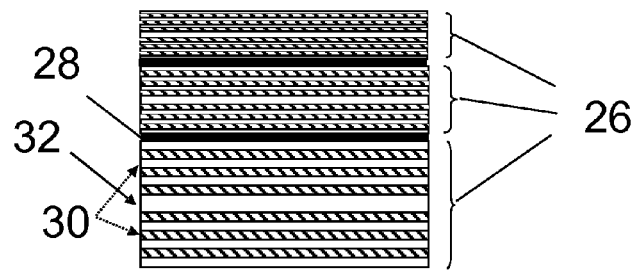
FIG. 5a is a sectional view of a multi-peak transmission filters according to an embodiment of the present invention.

FIG. 5a shows an exemplary embodiment of multi-peak transmission filters 24 for each of the R, G and B pixel portions that could comprise cascades of three Fabry Perot etalons 26. Such a cascaded filter structure is illustrated in FIG. 5a. The etalons are separated from each other by etalon spacer layers 28. For each etalon 26, the specific thickness of the sub-layers in each Bragg reflector 30 and of the gap layer 32 are selected to produce a transmission peak at the desired wavelength (e.g., 490, 525 and 600 nm for the R pixel portion). For example, one etalon 26 may have a transmission peak at 490 nm, a second etalon 26 may have a transmission peak at 525 nm and a third etalon may have a transmission peak at 600 nm. Also, the second etalon 26, for example, may have low transmission for wavelength of 550 nm, and possibly also of 575 nm, but have fairly high transmission at the wavelengths near 490 nm and 600 nm. In this way, the composite filter would transmit 490, 525 and 600 nm light but block 465, 550, 570 and 640 nm light, as desired.

A single-peak output transmission filter may be constructed from one of the Fabry Perot etalons 26. For example, the output filter for the R pixel portion could have a construction similar to that of the middle etalon 26 in the multi-peak transmission filter 24 of that pixel portion 20. The Bragg reflectors 30 of a Fabry Perot etalon 26 contain pairs of sub-layers with those pairs comprising a layer of material having higher refractive index and a layer of material having lower refractive index. Those refractive indices and the thickness of those sub-layers are selected using known techniques and determine the reflectance and bandwidth of the Bragg reflector 30.

Figure 5B:
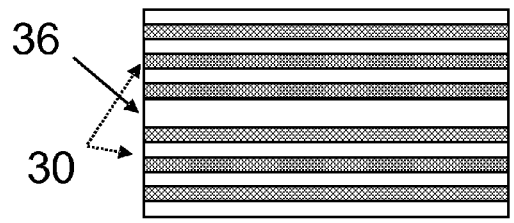
FIG. 5b is sectional view of a programmable transmission filter according to an embodiment of the present invention.

Instead of using the photochromic material as a programmable absorber of light, another embodiment makes use of the programmable refractive index of photochromic material. In this embodiment, the first functional layer 12 may comprise a transmission filter that contains one or more layers of photochromic material plus layers of other materials as a multi-layer optical filter. One exemplary embodiment of a programmable transmission filter 34 is illustrated in FIG. 5b. This filter 34 is a Fabry Perot etalon that has a photochromic sub-layer 36 placed between a pair of optical reflector sections 38. The optical reflector sections 38 may form Bragg reflectors and may comprise multiple pairs of sub-layers that have a higher refractive index and a lower refractive index in an alternating manner. Known methods and design tools for multi-layer optical films may be used to design the transmission filter 34. If the index (and/or thickness) of the photochromic sub-layer 36 changes, the transmission spectrum will change accordingly. This change typically results in a shifting of the transmission peak to a different wavelength and a broadening of the peak.

Figure 6:
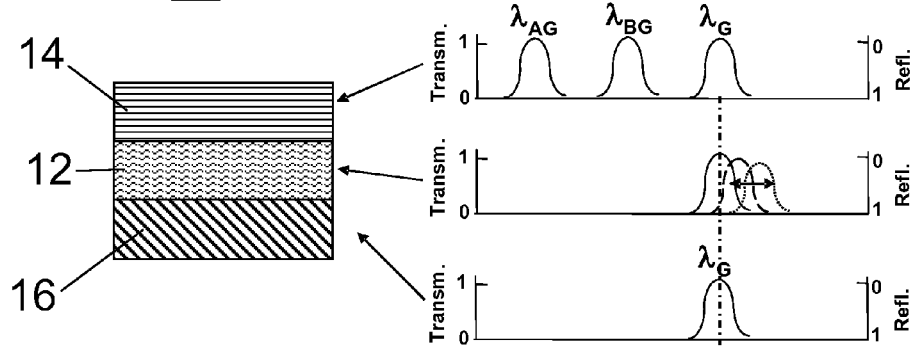
FIG. 6 is a sectional view of a transmission modulating pixel portion according to an embodiment of the present invention.

The combined function of the first functional layer 12 and third functional layer 16 of the pixel portion 20 for this embodiment is illustrated in FIG. 6. The transmission spectra of the first functional layer 12, the photochromic transmission filter, and the third functional layer 16, the output filter, may have their transmission peaks aligned with each other. The transmission spectrum of the photochromic transmission filter will change as the state of the photochromic material in that part is changed by the programming light. This change in state will result in a change in the refractive index of the photochromic material. The resulting change in the transmission spectrum of the photochromic filter will change the relative alignment of its transmission peak with respect to the fixed transmission peak of the output filter. This produces a modulation of the light that passes through the combination of both filters.

Figure 7:
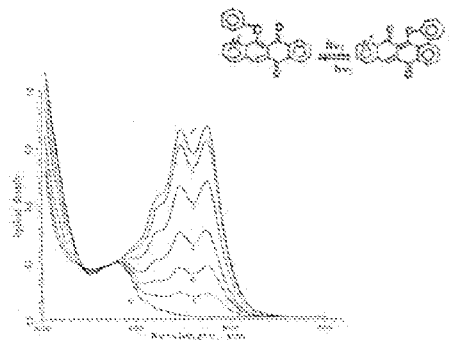
FIG. 7 shows the absorption spectra and chemical structures of exemplary photochromic materials according to an embodiment of the present invention.
Figure 7:
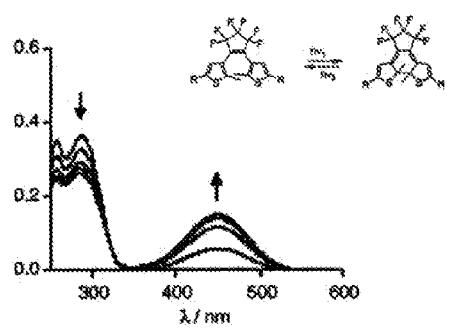
Figure 7:
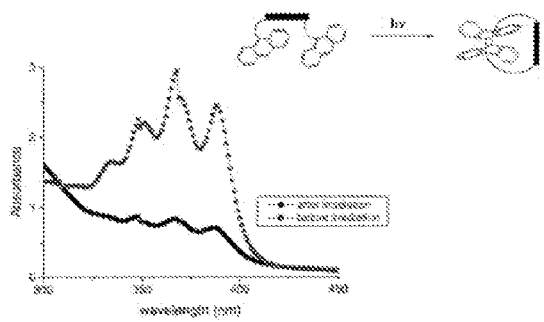

FIG. 7 illustrates some exemplary photochromic materials that may be used to construct a programmable transmission filtering structure. Referring to FIG. 7a, a photochromic material that might be used for the R pixel portion is 11-phenoxy-10-aza-5,12-naphthacenequinone. See N. Sokolyuk and L. Pisulina, "Synthesis and photochromism of peri-phenoxysubstituted azanaphthacenequinones," SPIE Proceedings, vol. 3347 (1998), pp. 189-194, which is herein incorporated by reference. This molecule can be photo-converted between its trans-isomer and its ana-isomer forms. The trans-isomer has very little absorption for wavelengths greater than 450 nm (as illustrated in FIG. 7a). The ana-isomer has a large absorption peak for wavelengths between 440 and 500 nm. There is little absorption at wavelengths greater than 550 nm. The large change in absorption between these two states results in a large change in the refractive index of this material when observed at 600 nm. Since this exemplary material has little absorption at 550 nm, it also could be used for the G pixel portion. This material could be converted from its trans-state into its ana-state by exposing it to programming light at a wavelength of 300 nm. The reverse conversion may be achieved by exposing the material to programming light at a wavelength of 440 nm.

FIG. 7b illustrates another exemplary material that might be used for both the G and the R pixel portions. It has some similarity to the 1,2-dithienylalkenes shown in FIG. 4 but has one of the thiophene rings replaced with a substituted olefin. See A. Peters, C. Vitols, R. McDonald and N. R. Branda, "Novel photochromic compounds based on the 1-thienyl-2-vinylcyclopentene backbone," Organic Letters, vol. 5, n. 8 (2003), pp. 1183-1186, which is herein incorporated by reference. This material converts between an open-ring form and a closed-ring form. The closed-ring form has a broad absorption peak between 410 nm and 490 nm, with very little absorption at wavelengths above 530 nm. Thus, there is substantial change in the refractive index of this material when observed at 550 nm or at 600 nm.

FIG. 7c illustrates another exemplary material that might be used for the B pixel portion. This material is an anthracene dipeptide. See P. S. Ramanujam and R. H. Berg, "Photochromic processes for high density optical storage," SPIE Proceedings, vol. 5069 (2003), pp. 57-63, which is incorporated herein by reference. In this material, the anthracene molecules are attached to a peptide backbone. This material can undergo dimerization when it is exposed to UV light. The conversion should be completely reversible. The absorption spectra for the two forms are shown in FIG. 7c. In particular, there is a large change in the absorption for the wavelength range between 350 nm and 400 nm. In this case, the open form has the strong absorption features and the closed form (the dimer) does not have those absorption peaks. Furthermore, there is very little absorption for wavelengths greater than about 440 nm with either isomer. Thus, there should be substantial change in the refractive index of this material when observed at a wavelength of 465 nm.

The photochromic material shown in FIG. 4b also may be used for the programmable transmission filter of a B pixel portion. Both the open-ring and closed-ring isomers of that material have very low absorption at the wavelength of 465 nm. The closed-ring isomer, however, has absorption peaks that appear at the wavelengths of 380-440 nm and again at the wavelengths of 500-740 nm. These absorption peaks, which are not present in the spectrum of the open-ring isomer, will be accompanied by a change in the refractive index, compared to the index of the open-ring isomer.

These exemplary materials illustrate some of the desired features of photochromic materials for the programmable transmission filter of the first functional layer 12. They preferably have little absorption at the associated R, G or B wavelength. Also, they should have a large optically programmable and reversible change in their absorption spectrum over a range of wavelengths that are different from the associated R, G or B wavelength of the pixel portion. This change in absorption spectrum results in a substantial change in the refractive index at the associated R, G or B wavelength.

The photo-induced change in the refractive index has not been measured for the specific exemplary molecules discussed above. However, the photo-induced index change has been measured for many other photochromic molecules. For example, the photochromic diarylethene can have a refractive index change as large as 0.0005 per wt % of the photochromic material when it is mixed into another polymer. See N. Tanio and M. Irie, "Photooptical switching of polymer film waveguide containing photochromic diarylethenes," Japanese Journal of Applied Physics, vol. 33 (1994), pp. 1550-1553, which is herein incorporated by reference. An amorphous film of such photochromic material or a film that has such photochromic material incorporated into a polymer backbone can have a refractive index change of approximately 0.05, since these films comprise primarily the photochromic material. See J. Chauvin, T. Kawai and M. Irie, "Refractive index change of an amorphous bisbenzothienylethene," Japanese Journal of Applied Physics, vol. 40 (2001), pp. 2518-2522; J. Biteau, et al., "Large and stable refractive index change in photochromic hybrid materials," Chem. Materials, vol. 10 (1998), pp. 1945-1950, which is herein incorporated by reference.

The references cited above on photochromic materials also describe various ways to construct thin films of photochromic materials. Thin films that contain photochromic molecules may be obtained by mixing the photochromic molecules with polymer molecules such as polystyrene or polymethylmethacrylate in a suitable solvent such as cyclohexanone or dichloromethane. The mixture is then coated onto the substrate material for the screen by various means such as spinning coating or spraying. The solvent is then removed, typically by baking or evaporation in a vacuum chamber, to leave the photochrome-doped polymer. Another method is to make an amorphous film of the photochromic molecules themselves, typically when the molecules have larger side chains. Yet another way to make a film is to incorporate the photochromic molecules directly into a polymer structure, such as into its backbone.

Figure 8A:
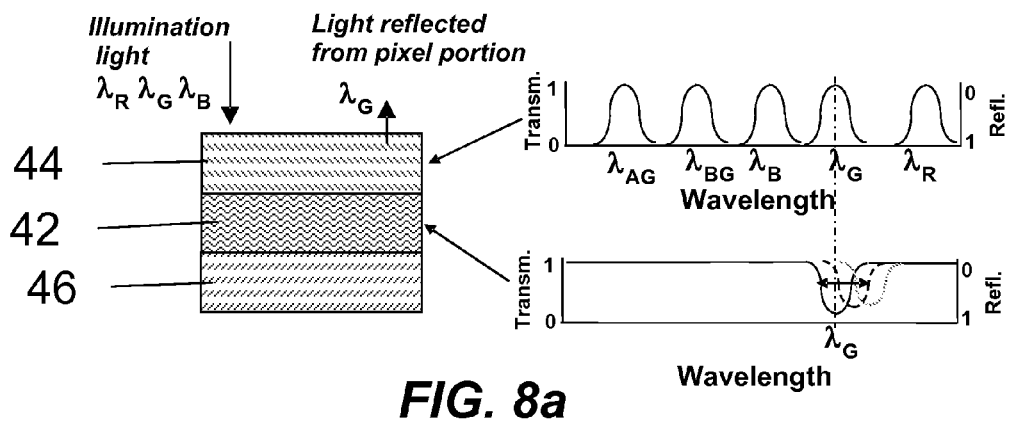
FIG. 8a is a sectional view of a programmable reflection modulator pixel portion according to an embodiment of the present invention.

FIG. 8 shows another embodiment of the invention. In this embodiment, a screen can act as a programmable reflection modulator for a front projection display system. This screen has many similarities with the programmable transmission modulator embodiment described above. For example, this screen can be divided into multiple pixel portions 40, with each pixel portion 40 corresponding to a wavelength (e.g., R, G or B) from which the image is constructed. The screen for this embodiment has 3 functional layers, as illustrated in FIG. 8a. The first functional layer 42 is a programmable multi-layer optical reflection filter. This layer 42 contains the photochromic material. The filter has a reflection peak that can be shifted according to the programmable characteristics of the photochromic material. A second functional layer 44 is a multi-peak transmission filter that selects the wavelengths for programming the photochromic material that is in the first functional layer 42. A third functional layer 46 is a black absorber. The black absorber prevents any light reaching it from being reflected back from the pixel portion 40.

Figure 8B:
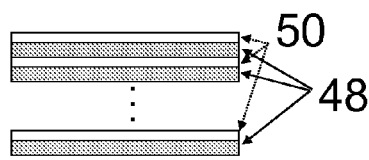

The first functional layer 42 may be a multi-layer optical interference filter that contains alternating layers of photochromic material and non-photochromic material, as illustrated in FIG. 8b. This optical filter has a peak in reflection at a certain optical wavelength, which is designed to correspond to one of the R, the G or the B wavelengths. Light at other wavelengths are transmitted through this filter. The refractive index of the photochromic material can be changed. This change in the refractive index shifts the wavelength location of the reflection peak and also can change the spectral width of that peak. The photochromic materials shown in FIGS. 7 and 4b can be used for the R, G and B pixel portions of this first functional layer 42, a programmable reflection filter. These materials can be programmed by a pair of programming wavelengths that are substantially different from the associated R, G or B wavelength of the filter. As an alternative, the first functional layer 42 also may comprise a Fabry Perot etalon that contains a sub-layer of photochromic material placed between a pair of optical reflectors. A change in the refractive index of the photochromic material results in a change in the reflection spectrum of the etalon. In general, the multi-layer interference filter can be expected to produce a narrower reflection peak than the Fabry Perot etalon.

The second functional layer 44 in each pixel portion of this exemplary embodiment is a multi-peak multi-layer optical transmission filter. Two of the transmission peaks of this programming filter coincide with the two wavelengths used to program the photochromic material between its two states. The other peaks coincide, preferably, with the R, G and B wavelengths.

For example, consider the material shown in FIG. 7a that is used in a G pixel portion 20. The multi-peak transmission filter of this second functional layer 44 can have transmission peaks located at 320 nm and at 410 nm for converting the photochromic phenoxynaphthacene quinone to its ana-state and to its trans-state, respectively. In this example, the second functional layer 44 has transmission peaks at 320 and 410 nm as well as 465, 550 and 600 nm. If the material of FIG. 7b is used for the R pixel portion, it may be programmed using 290 nm and 440 nm. Thus, the second functional layer 44 for the R pixel portion would have transmission peaks at 290, 440, 465, 550 and 600 nm. Furthermore, it may be possible to use the wavelengths of 370 nm and 265 nm to program the B material shown in FIG. 7c. Then, the second functional layer 44 for a B pixel portion would have transmission peaks at 265, 370, 465, 550 and 600 nm.

Furthermore, the R and G wavelengths also may be transmitted through a single wider filter peak instead of individually through two separate filter peaks since the photochromic materials have little sensitivity to this range of wavelengths. A cascade of Fabry Perot etalons, as illustrated in FIG. 5b, may be used to construct the desired multi-peak transmission filters. In the case of this embodiment, 4 or 5 appropriately designed etalons would need to be cascaded.

The reflection of the R, G or B light by the first functional layer 42 changes primarily because the reflection peak moves, so that less of the R, G or B light is reflected. The reflection peak preferably moves to longer wavelengths to reduce the reflection, as illustrated in FIG. 8a. This move toward the longer wavelengths is preferred because the programming wavelengths are at shorter wavelengths relative to the R, G and B light. By moving the reflection peaks (for the programmable reflection filter) to longer wavelengths, the reflection of the associated R, G or B light can be modulated without affecting the reflection of the first functional layer 42 at the various programming wavelengths. In this way, the first functional layer 42 will not reflect those programming wavelengths.

The third functional layer 46, the black absorber, can be constructed from various known materials such as carbon-black paint, gold-black films and carbon-nanotube coatings. Examples of gold-black materials that are suitable for visible wavelengths are described in an article by Harris and McGinnies See. L. Harris and R. T. McGinnies, "The preparation and optical properties of gold blacks," Journal of the Optical Society of America, vol. 38, n. 7 (1948), pp. 582-589, which is herein incorporated by reference. Such coatings can be used as broadband absorbers of light. These materials not only absorb the light but also have a rough or netted surface so that very little light is reflected.

Figure 9:
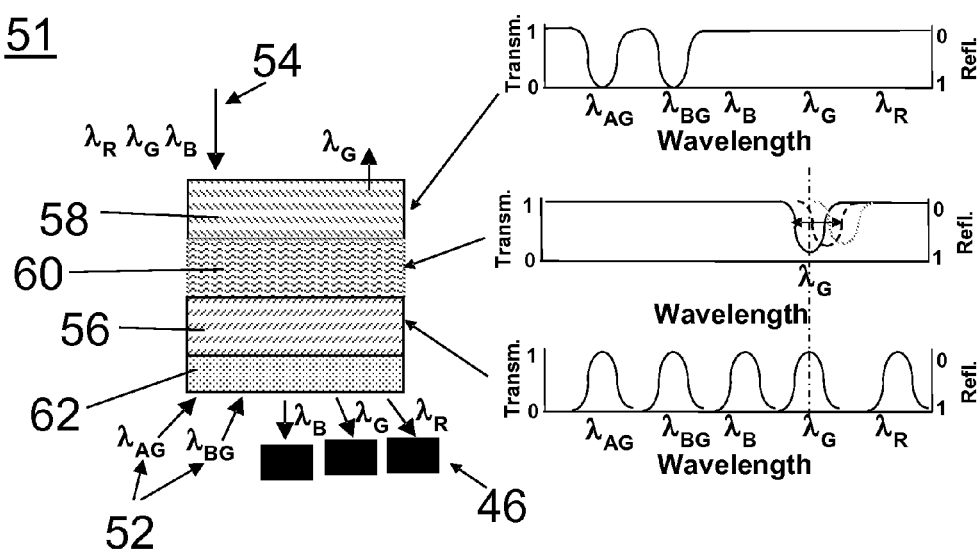
FIG. 9 is a sectional view of a programmable reflection modulator pixel portion according to an embodiment of the present invention.

FIG. 9 shows an embodiment of a reflecting display memory screen 51 that is illuminated with RGB light 54 from the side of the viewer (the front side) but has the programming light beam 52 supplied from the back side of the screen 51. With such an embodiment, the programming light beam 52 can be kept away from a viewer. One layer of this screen is the programmable reflection filter that may comprise a multi-layer combination of photochromic material and non-photochromic material, such as the interference filter construction illustrated in FIG. 8b. This reflection filter reflects the R, G or B wavelength associated with the pixel portion 20. The operation of this filter is similar to the operation of the programmable reflection filter in the embodiment of FIG. 8a.

Furthermore a multi-peak transmission filter layer 56 located on the programmer side of the screen 51, but on the side away from the viewer selectively transmits the two programming wavelengths for the pixel portion 20 and also transmits the R, G and B wavelengths. This filter 56 can be similar to the filter in the second functional layer 44 of the embodiment shown in FIG. 8a. The front layer 58 of this screen 10 whose embodiment is shown in FIG. 9 is located closest to the viewer. This front layer 58 is a multi-peak reflection filter, having one or more reflection peaks, that reflects the two programming wavelengths for a given pixel portion 20. This front layer 58 also transmits the R, G and B light into the programmable reflection layer 60. A multi-peak reflection filter can be constructed by cascading a set of single-peak reflection filters, with each single-peak reflection filter having a reflection peak located at a wavelength that is different from the reflection peaks of the other single-peak reflection filters.

A fourth part of this embodiment is a diffractive element 62, such as a grating, that can separate (or combine) the various wavelengths of light. R, G and B light from the multi-peak transmission layer 56 can be split by the diffractive element 62 into separate beams. These beams are then directed to one or more black absorbers to prevent that light from being reflected back toward the viewer. Light at the programming wavelengths are supplied, likely as separate beams by a projector, and directed toward the diffractive element 62. The diffractive element 62 combines the beams of programming light 52 and directs that programming light 52 to the first 3 layers 56, 58, 60 of the structure. In some cases, it may be desirable to incorporate the diffractive element 62 into the faces of a polygonal scanner, such as the ones described below. Note that with this embodiment, the programming light 52 makes two passes through the photochromic material. Thus, a somewhat lower intensity of the incident programming light would be needed to achieve the same photochromic change.

Figure 10:
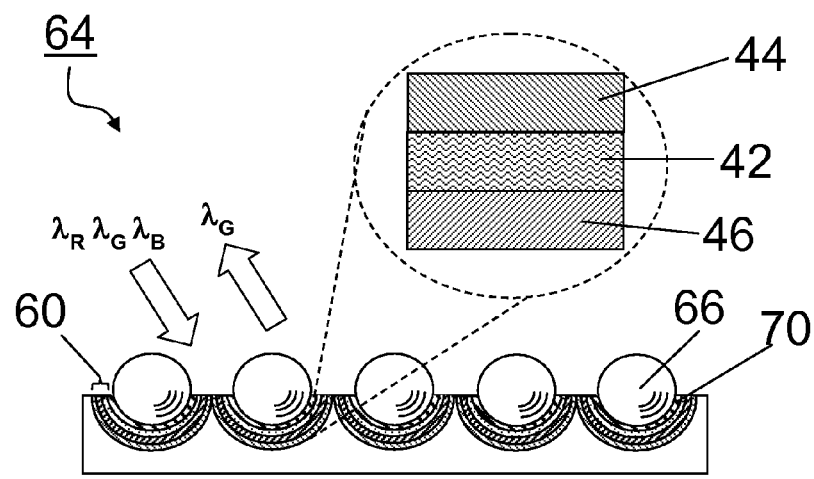
FIG. 10 is a sectional view of a programmable retro-reflection modulator pixel portion according to an embodiment of the present invention.

In another exemplary embodiment, the pixel portions 20 may be incorporated into a retro-reflecting structure. FIG. 10 shows one exemplary retro-reflecting pixel portion 64, with a single pixel portion shown. The pixel portion 64 contains a number of lens beads 66 that can refract light. Each of the lens beads 66 can focus incident light onto a curved focal plane. A programmable reflection layer 60, such as one shown in FIG. 8a, is constructed at the back side of each lens bead 66. The second functional layer 44 of that reflection layer 60 (i.e., the multi-peak transmission filter that selects the programming wavelengths) is located closest to the lens bead 66. The programmable reflection filter, the first functional layer 42, is located preferably at the focal plane of the lens bead. The third functional layer 46, a black absorber, is located at the back side of the programmable reflection layer 60, on the side away from the lens bead 66.

Figure 11:
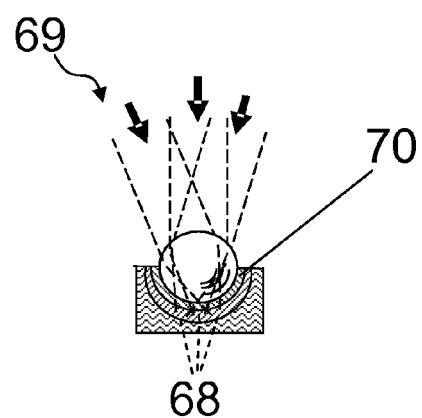
FIG. 11 is a sectional view of a single lens bead unit of the pixel portion shown in FIG. 10.

One reason for locating the programmable reflection layer 60 at the focal plane of the lens bead 66 is that multiple distinct focused spots 68 can be defined within the total area of the film at each lens bead 66, as illustrated in FIG. 11. Each of these focused spots 68 can be considered as distinct pixel portions that can be viewed by different viewing locations 69. They also can be programmed by different programming projectors. Thus, each of these focused spots 68 can be programmed differently to reflect the differing modulation levels of the R, G or B wavelength for that particular pixel location as required by the different viewer images.

For a retro-reflecting screen, a given pixel will contain several strips of retro-reflecting pixel portions 64, such as the one illustrated in FIG. 10. Each strip may be for a different pixel portion 64 and may selectively reflect a different R, G or B wavelength. However, each strip may contain the pixel portions 64 for multiple viewers. For example, the R pixel portions 64 for several viewers may be contained in a given strip and the G pixel portions 64 for several viewers may be contained in another strip.

In particular, the embodiment illustrated in FIG. 11 shows a lens bead 66 that determines a focal plane. However other types of optical lenses (such as hemispherical lenses, compound lenses or diffractive lenses) that can determine focal planes also may be used. Also, if the focal planes of the retro-reflecting screen are flat (as achieved with some of these other types of optical lenses) instead of curved, it may be possible to use two sets of lenses that are located on opposite sides of the focal plane that share the same focal plane. These lenses could then be aligned such that they couple light into the same focus spot but from opposite sides of the programmable reflection modulating film. In this way, the reflection modulating film may be illuminated with the white or RGB light from one side of that film and have the programming light supplied from the opposite side, in a way similar to the construction illustrated in FIG. 9.

A lens bead 66 that has a uniform optical refractive index has degraded optical properties due to spherical aberration, which results in enlargement of the focus spot size. When a retro-reflection modulator also contains a spacer layer 70 between the lens bead 66 and the programmable reflecting layer 60, it may be preferable to use a lens bead 66 that has a radially graded refractive index profile. Such graded-index (GRIN) spherical lenses can have less spherical aberration. See Y. Koike, A. Kanemitsu, Y. Shioda, E. Nihei and Y. Ohtsuka, "Spherical gradient-index polymer lens with low spherical aberration," Applied Optics, vol. 33 (1994), pp. 3394-3400, which is herein incorporated by reference.

In some embodiments, image is project on the screen by a raster scanned projector. In a raster scanned projector, the light beam must be moved very quickly for the line scan and can be moved more slowly for the frame scan. In other embodiments, polygonal scanner may be used. A polygonal scanner, that has mirrors placed on the sides of a rotating polygon, is one way to achieve the fast line scan. For a HDTV system with horizontal scan lines, the mirror would need to make 1920×3600 scans per minute. For a total scan angle of 30 degrees, the rotating polygon would need to have 24 mirrors and would need to rotate at a speed of 288,000 rpm. State-of-art commercial polygonal scanners are capable of only 30,000-40,000 rpm maximum scan speeds. Thus, one would need to divide the screen into 8 to 10 sections with a different section scanned in each rotation of the frame scanner. The frame scan can be achieved with a polygonal scanner that is rotated at a slower rate of 3600 scans per minute for each section. To achieve a 60 degree range of incident angles, the maximum number of mirrors the frame-scan polygon can have is 12. This translates to a rotation speed of 300 rpm per section of screen and a net rotation speed of 2400-3000 rpm.

Furthermore, a display with more pixels can be achieved by dividing the screen into more sections and by rotating the film scanner at a faster speed. The fastest commercial polygonal scanners have a speed that is ten times faster than needed for the frame-scan polygon of the exemplary design given above. Thus, screens having many more pixels than current HDTV format may be accommodated by current scanner technology.

In some cases, such as for an image that requires very high resolution but changes slowly, it may be preferable to use a vector scan instead of using a raster scan for programming the screen. A fast galvanometer steered mirror may be used to steer the programming beam. Fast commercial galvo-mirrors can have a response time of 0.10 milliseconds for small changes in angle. This means that a maximum of 166 pixels could be updated in one frame interval of 1/60 second. Other types of scanning mechanisms such as arrays of MEM (Micro Electro Mechanical) mirrors also may be used to produce one or more beams and then scan them across the surface of the screen. It may be possible to combine the vector scan with a beam size (or spot size) adjustment. This may be done by moving a focusing lens or focusing mirror, thereby the programming beam could be adjusted to program a single pixel, a pixel portion, or multiple pixels with the same combination of programming wavelengths and intensities. This feature can be beneficial when multiple adjacent pixels of the displayed image are to have the same color and intensity, which often is the case.

Furthermore, for either the raster scanned or vector scanned approach, the scanning speed need not be determined by a conventional TV frame rate since the display pixels 18 have memory. Instead, the scanning speed can be determined by the rate at which the image content changes. For example, fast motion pictures will likely require much greater scanning rates than SAR (Synthetic Aperture Radar) images.

Figure 12:
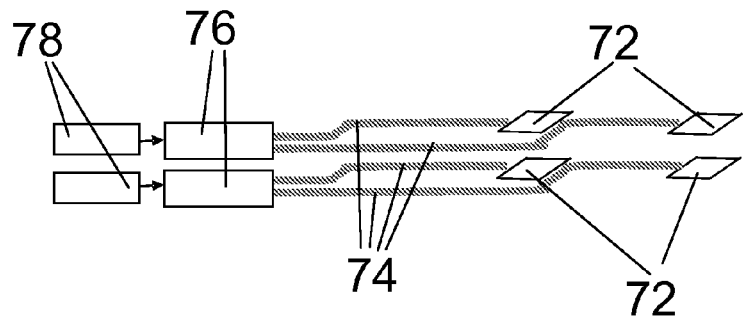
FIG. 12 is a schematic showing a programming light source.

FIG. 12 shows another exemplary embodiment 71 of the invention, the programming light may be selectively supplied to the pixels 72 by a network of optical waveguides 74. These optical waveguides 74 feed the programming light to individual pixels or to groups of pixels 72. For example, each pixel 72 may be located at a separate endpoint node of the optical waveguide 74 network. One or more optical switch matrices 76 may be used to switch the light from one or more sets of programming light sources 78 (such as lasers and LEDs that emit at the desired programming wavelengths) to the pixels 72. A number of known optical switches, such as waveguide switches and mirror switches may be used to perform the switching functions. The set of programming light sources 78 emit light of the desired combination of wavelengths and intensities for programming a particular pixel or group of pixels 72 when that programming light is switched to that particular pixel or group of pixels 72.

Furthermore, the light sources 78 for programming the screen may be built into the display screen itself. For example, the light sources 78, which can be quite small in size, could be located at the periphery of the display screen, or be built into a structural frame for the screen. The display pixels 72 (which also act as optical waveguides) and the waveguide 74 distribution and switching matrix 76 can be built into the display screen. Thus, the display screen, with integral programmer, can be quite thin. In some embodiments, the optical waveguides 74 may be formed in polymer materials and multiple layers of optical waveguides 74 may be placed above each other.

Figure 13:
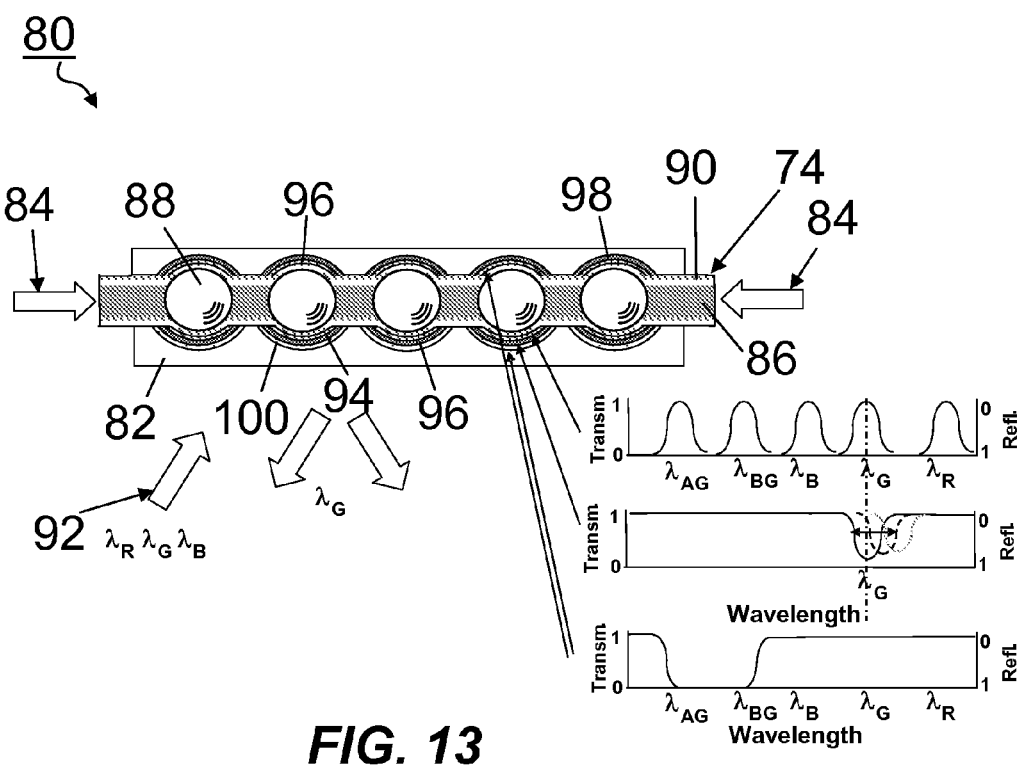
FIG. 13 is a sectional view of an optical waveguide comprising programmable reflective elements.

FIG. 13 illustrates the main elements of an optical waveguide fed pixel portion 80. This pixel portion 80 is an optical reflection modulator that is illuminated from its front side 82 (which faces the viewer) and that has the programming light 84 supplied from the back side of the programmable reflecting layer by means of an optical waveguide 74. The waveguide 74 has a core layer 86 that also includes spherical beads 88. The portions of the waveguide core 86 that is between adjacent beads 88 as well as at the outer ends of the waveguide 74 have the same refractive index as that of the beads 88. The waveguide core 86 and the beads 88 are sandwiched between layers of lower index material, the spacer, which acts as a waveguide cladding 90. The combination of the core 86 and the cladding 90 functions as an optical waveguide 74 for the programming light 84. Such a waveguide 74 confines and guides the programming light 84 as a result of total internal reflection at the interface between the core 86 and cladding 90 materials. That programming light 84 is supplied from one or more ends or edges of the waveguide 74.

The beads 88 serve as engineered "scattering" elements that direct the light out of the path of the waveguide 74 and toward the various parts of the programmable reflecting layer, which coat the beaded regions. These parts cover the front and back portions of the beads 88 that are not in contact with the remaining waveguide core material. Three wavelength selective functional layers are located at the front side 82 of the beads, the side facing the viewer. These three parts are similar to the comparable parts of the reflection modulator illustrated in FIG. 9. These parts select the specific wavelengths of the programming light 84 for that pixel portion 80, modulate the reflection of that pixel portion 80 to the illumination light 92, and (optionally) prevent those programming wavelengths from being directed out of the screen toward a viewer.

A multi-peak transmission filter 94 that selects the programming wavelengths is located away from the viewer, and closest to the bead 88. A programming light reflection filter 96 that reflects the programming light 84 for a second pass through the photochromic material is located closest to the viewer, and farther from the bead 88. A nonreflecting black absorber layer 98 is located at the back side of the bead 88 and acts to absorb those illumination wavelengths that are not reflected back to the viewer by the programmable reflecting layer parts on the front side 82 of the bead. An optional second programming light reflection filter 96 for the programming wavelengths is located between the black absorber layer 98 and the bead 88. This second programming light reflection filter 96 reflects those portions of programming light that is scattered toward the back and redirects it toward the photochromic material on the front side 82 of the bead 88, to make more efficient use of that programming light 84.

The illumination light 92 is generally supplied from the wide sides or faces of a strip of the pixel portion 80 shown in FIG. 13. Thus, most of that light 92 can pass through a given bead 88, from its front side to its back side, without being redirected to propagate along the waveguide 74 to an adjacent beaded region. For the programming light 84, which propagates down the waveguide 74, some of that light 84 passes through a given beaded region onto the next beaded region and some of that light 84 is deflected (by total internal reflection from the curved bead/spacer interface) toward the parts of the programmable reflecting layer. Some of that programming light 84 also is deflected toward the black absorber layer 98, which could serve as an undesirable loss mechanism for the programming light 84. The optional second programming light reflection filter 96 located between the black absorber layer 98 and the cladding 90 selectively reflects the programming light 84 back into the beads 88 (toward the other parts of the programmable reflecting layer). Note that there are filters 96 which reflect the programming light 84 located on both sides of each beaded region. In this way, more of the programming light 84 that is captured by a given beaded region (instead of propagating through that region) will be utilized to program the photochromic material of that beaded region.

The embodiment shown in FIG. 13 produces a diffuse wavelength selective reflector of the illumination light 92. The R, G or B light reflected from the pixel portion 80 appears to be produced by a set of point sources, which correspond to the various beaded regions. It also is possible to construct a waveguide fed pixel portion embodiment that retro-reflects the illumination light 92. In this embodiment, the multi-peak transmission filter 94 for selecting the programming wavelengths and the programmable reflection filter 100 would be located on the back side of the lens beads 88, with the multi-peak transmission filter 94 located closest to the bead 88. These two layers 94, 100 would be located to the inside (the bead side) of the beaded region, with the optional second programming light reflection filter 96 for the programming light 84 and the black absorber layer 98 located on the outside of these two layers 94, 100. The first programming light reflection filter 96 for the programming light 84 still would be located on the front side 82 of the beaded region. The programmable reflection filter 96 is preferably located at approximately the focal plane of the lens bead 88, in order to obtain the maximum retro-reflection.

Note that instead of placing the multi-peak transmission filter 94 that selects the programming wavelengths for a pixel portion 80 at each beaded region, it also is possible to perform that filtering function by placing the filter 94 at the edges of the waveguide 74. The programming light 84 is coupled into the waveguide 74 at those edges. In that case, the multi-peak transmission filter 94 needs only have two transmission peaks, which pass the two desired programming wavelengths for that pixel portion 80.

From the foregoing description, it will be apparent that the present invention has a number of advantages, some of which have been described herein, and others of which are inherent in the embodiments of the invention described or claimed herein. Also, it will be understood that modifications can be made to the device and method described herein without departing from the teachings of subject matter described herein. As such, the invention is not to be limited to the described embodiments except as required by the appended claims.

What is claimed is:

1. A projection screen on which an image can be displayed by receiving a projection light, the screen comprising a plurality of pixels, each of the plurality of pixels comprising at least two pixel portions, each pixel portion comprising:
    a programmable wavelength selective layer having a photochromic material and a multi-peak transmission filter layer;
    wherein the programmable wavelength selective layer has a state that can be modified by programming light of specific wavelengths associated with that pixel portion, and wherein the multi-peak transmission filter layer transmits to the programmable wavelength selective layer those specific wavelengths of programming light associated with that pixel portion and rejects those other wavelengths of programming light associated with other pixel portions of said each of the plurality of pixels;
    whereby each pixel portion modulates a different predetermined wavelength of projection light, said wavelength being associated with that pixel portion.

2. The projection screen of claim 1 wherein the photochromic material of a pixel portion has a variable absorption of the predetermined wavelength of projection light associated with that pixel portion,
    said absorption being modified by programming light of specific wavelengths associated with that pixel portion.

3. The projection screen of claim 1 wherein the photochromic material of a pixel portion has a variable refractive index at the predetermined wavelength of projection light associated with that pixel portion,
    said refractive index being modified by programming light of specific wavelengths associated with that pixel portion.

4. The projection screen of claim 3 wherein the programmable wavelength selective layer of a pixel portion comprises multiple layers of photochromic material and wherein said multiple layers of photochromic layers are separated by layers of non-photochromic material,
    said multiple layers of photochromic material and said layers of non-photochromic material forming a programmable reflection filter.

5. The projection screen of claim 1 wherein the multi-peak transmission filter layer of a pixel portion also transmits the predetermined wavelength of projection light associated with that pixel portion.

6. The projection screen of claim 1 wherein the multi-peak transmission filter layer of a pixel portion reflects the predetermined wavelengths of projection light associated with other pixel portions of said each of the plurality of pixels.

7. The projection screen of claim 1 further comprising an output transmission filter, wherein the programmable wavelength selective layer is situated between the multi-peak transmission filter and the output transmission filter; said output transmission filter transmitting the predetermined wavelength of projection light associated with that pixel portion.

8. The projection screen of claim 1 further comprising a black absorber layer, wherein the programmable wavelength selective reflection layer is situated between the multi-peak transmission filter layer and the black absorber layer, said black absorber layer absorbing light of all wavelengths of projection light and all wavelengths of programming light.

9. The projection screen of claim 8 further comprising the black absorber layer selected from the group consisting essentially of: carbon-black paint, gold-black films and carbon-nanotube coatings.

10. The projection screen as claimed in claim 8 wherein the each pixel portion further comprises a retro-reflecting structure.

11. The projection screen of claim 1 wherein the multi-peak transmission filter layer of a pixel portion also transmits the predetermined wavelengths of projection light associated with all pixel portions of a pixel;
    wherein the programmable wavelength selective layer reflects only the predetermined wavelength of projection light associated with that pixel portion and transmits other wavelengths of projection light not associated with that pixel portion.

12. The Projection screen of claim 1 further comprising a multi-peak reflection filter layer; a diffractive element layer; and a black absorber layer;

wherein the programmable wavelength selective layer is situated between a first side of the multi-peak transmission filter layer and the multi-peak reflection filter layer; and wherein the diffractive element layer is situated between the second side of the multi-peak transmission filter layer and the black absorber layer, said black absorber layer absorbing light of all wavelengths of projection light and all wavelengths of programming light.

13. The projection screen of claim 12 further comprising the black absorber layer selected from the group consisting essentially of: carbon-black paint, gold-black films and carbon-nanotube coatings.

14. The projection screen of claim 1 wherein each pixel portion comprises: an optical waveguide with at least one end, a front side, and a back side; the waveguide comprising a plurality of spherical beads forming bulged areas on the front side and the back side of the waveguide where the beads are located;

wherein said programmable wavelength selective layer is disposed on the front side of the waveguide substantially covering the bulged areas thereon.

15. The projection screen of claim 14 further comprising a first programming light reflection filter layer overlaid on the programmable wavelength selective layer; and a black absorber layer disposed on the back side of the waveguide substantially covering the bulged areas thereon, said black absorber layer absorbing light of all wavelengths of projection light and all wavelengths of programming light.

16. The projection screen of claim 15 wherein each pixel portion further comprises a second programming light reflection filter layer disposed between the black absorber layer and the back side of the waveguide.

17. The projection screen of claim 14 wherein the programmable wavelength selective layer reflects only the predetermined wavelength of projection light associated with that pixel portion and transmits other wavelengths of projection light not associated with that pixel portion.

18. The projection screen of claim 14 wherein said multi-peak transmission filter layer is disposed on the front side of the waveguide substantially covering the bulged areas thereon; and wherein said programmable wavelength selective layer is overlaid on the transmission filter layer.

19. The projection screen of claim 14 wherein said multi-peak transmission filter layer is disposed on at least one end of said optical waveguide.

20. A method of displaying an image on a projection screen comprising the steps of:

programming the state of each pixel of the projection screen by temporarily illuminating that pixel with programming light; and illuminating each pixel of the projection screen with projection light of at least two wavelengths;

wherein said each pixel comprises at least two pixel portions, each one of said at least two pixel portions having a programmable state that modulates a particular wavelength of said projection light associated with that pixel portion and that does not modulate other wavelengths of said projection light not associated with that pixel portion; and wherein each pixel is capable of retaining its state when said pixel is not being illuminated with said programming light.

21. The method of claim 20 wherein said programming light comprises multiple different wavelengths;

each pixel portion selecting specific wavelengths of programming light associated with that pixel portion and rejecting other wavelengths of programming light not associated with that pixel portion.

22. The method of claim 20 wherein the step of programming the state of each pixel of the projection screen comprises controlling the transmission of a particular wavelength of said projection light associated with a pixel portion of said pixel, said pixel portion not transmitting other wavelengths of said projection light that are not associated with that pixel portion.

23. The method of claim 20 wherein the step of programming the state of each pixel of the projection screen comprises controlling the reflection of a particular wavelength of said projection light associated with a pixel portion of said pixel, said pixel portion not reflecting other wavelengths of said projection light that are not associated with that pixel portion.

24. The method of claim 20 wherein the step of programming the state of each pixel of the projection screen comprises illuminating first one size area of the projection screen with programming light and then illuminating a different size area of the projection screen with programming light.

* * * * *